(12) United States Patent
Turco (10) Patent No.: US 9,956,468 B2
(45) Date of Patent: May 1, 2018

(54) GOLF VISION DISCIPLINE TRAINING SYSTEM AND METHOD

(71) Applicant: Anthony Turco, Liberty Township, OH (US)

(72) Inventor: Anthony Turco, Liberty Township, OH (US)

( * ) Notice: Subject to any disclaimer, the term of this patent is extended or adjusted under 35 U.S.C. 154(b) by 0 days. days.

(21) Appl. No.: 15/243,042

(22) Filed: Aug. 22, 2016

(65) Prior Publication Data

US 2017/0050100 A1 Feb. 23, 2017

Related U.S. Application Data

(60) Provisional application No. 62/208,106, filed on Aug. 21, 2015.

(51) Int. Cl.
| | |
|---|---|
| *A63B 69/00* | (2006.01) |
| *A63B 69/36* | (2006.01) |
| *G02C 5/00* | (2006.01) |
| *G02C 7/10* | (2006.01) |
| *G02C 7/16* | (2006.01) |
| *A63B 71/06* | (2006.01) |

(52) U.S. Cl.
CPC .......... *A63B 69/3608* (2013.01); *G02C 5/003* (2013.01); *G02C 7/105* (2013.01); *G02C 7/16* (2013.01); *A63B 2071/0666* (2013.01); *A63B 2210/50* (2013.01)

(58) Field of Classification Search
CPC ........ A63B 69/3608; A63B 69/36; G02C 5/00
See application file for complete search history.

(56) References Cited

U.S. PATENT DOCUMENTS

| | | | |
|---|---|---|---|
| 2,045,399 A | | 6/1936 | McMurdo |
| 2,663,021 A | * | 12/1953 | Douglass ................. G02C 7/16 2/433 |
| 3,264,002 A | | 8/1966 | Palumbo |
| 5,177,510 A | | 1/1993 | Peters et al. |
| 5,488,438 A | | 1/1996 | Cochran |
| 6,505,931 B2 | * | 1/2003 | Goldblatt ................. G02C 7/16 351/45 |
| 8,449,401 B2 | | 5/2013 | Kayama |
| 2002/0137571 A1 | * | 9/2002 | McMahon ......... A63B 69/3608 473/210 |

* cited by examiner

*Primary Examiner* — Michael Dennis
(74) *Attorney, Agent, or Firm* — Wood Herron & Evans LLP (57) ABSTRACT

An eyeglass assembly for training golfers includes first and second lenses that are opaque except at first and second viewing portions. The first viewing portion on the first lens provides a first eye of the user with a view of the target in a target region, such as the golf ball, while the second viewing portion provides a second eye of the user with a view not including the target region. An opaque feature such as a horizontal line is also provided on the second lens such that the eyes of the user co-register the horizontal line with the first viewing portion to form a focus point that must be maintained on the golf ball if head movement is to be avoided during a swing. The opaque portions at the remainder of the assembly prevent visual distractions that may undesirably move the eyes and the head during the swing.

5 Claims, 6 Drawing Sheets

GOLF VISION DISCIPLINE TRAINING SYSTEM AND METHOD

CROSS-REFERENCE TO RELATED APPLICATION

This application claims priority to U.S. Provisional Application Ser. No. 62/208,106, filed Aug. 21, 2015. This prior application is incorporated herein by reference, in its entirety.

TECHNICAL FIELD

The present invention relates generally to discipline training for a person's vision, and more particularly, to a vision discipline training system including eyeglass assemblies that may be used in sports training.

BACKGROUND

In golf and other similar sports, a proper form during a stroke or swing is very important. When learning how to golf, a user first attempts to master the fundamentals of a correct grip, stance, and swing. The goal is to be able to consistently reproduce a swing with the proper form. Of particular importance to a golf swing is the balance of the user. Any movements of the user's head may result in a shift of balance, which in turn affects the progression of the swing.

In order to swing smoothly and hit a golf ball correctly, a user should take a swing with his or her eyes on the ball from the beginning of the swing motion through to the end of the swing. In other words, the user's head should be kept substantially motionless during the motion of the swing so as to make both body and shoulders smoothly rotate in a coordinated manner. Keeping the head motionless during such movement is made difficult due to the fact that humans involuntary respond to movement and activity within their fields of peripheral vision. To this end, as the eyes move, the head and body move. Thus, once the eyes move during a golf swing or similar activity, the head and body will typically follow with associated movement(s), which will degrade the golf swing. When a user winds up for their swing, the user may lose sight of the ball and have to recapture it during the swing. As the eyes track to find the ball, this can cause the head and body to move thereby changing the swing, typically with deleterious effect on the result of the golf swing.

Several conventional devices have been developed for training the vision and swing movements of golfers or other sportsmen and women. For example, Peters, U.S. Pat. No. 5,177,510 describes a pair of training glasses with transparent lenses and horizontal and vertical lines drawn on the lenses to help the golfer focus on a single point "in the crosshairs." However, the transparent lenses continue to allow the eyes to capture all movements occurring in all directions, and it is difficult to train the human eye to avoid moving towards such distractions. As a result, the training glasses in Peters require additional discipline of the users which may simply not be present in some circumstances, and at a minimum, additional training must be used to make these glasses work for their intended purpose. Another conventional design is described in Goldblatt, U.S. Pat. No. 6,505,931, wherein the lenses of training glasses are provided with a pinhole and a horizontal line in one embodiment. However, these glasses have proven difficult to use for golfers for multiple reasons, including an inability to track a shot following the swing (to confirm whether the swing was performed appropriately) and the difficulty with accurately seeing through the pinhole in one lens. Accordingly, the devices such as shown in these conventional designs are often discarded by users before they are effective at improving a user's golf swing and game.

There is a need, therefore, for an assembly that addresses one or more of the needs in the field of vision training and provides for improved focus and easier use during training, for golf and/or other sporting endeavors.

SUMMARY

According to one embodiment of the invention, an eyeglass assembly enhances eyesight focus of a user, such as a golfer in one example. The assembly includes a first lens that is opaque but also includes a first viewing portion which is configured to provide a first eye of the user with a first view of a target in a target region when the first eye focuses on the first viewing portion. A second lens is coupled to the first lens. The second lens is opaque but includes a second viewing portion which is configured to provide a second eye of the user with a second view that does not include the target region. The second lens also includes an opaque feature that is differentiated from a remainder of the opaque second lens and that the second eye may focus on to avoid suppression of feedback to a brain of the user from the second eye. The first and second lenses are configured such that when the user wears the eyeglass assembly and focuses with first and second eyes on the first viewing portion and the opaque feature, the first and second eyes can maintain continuous focus on the target by co-registering the first viewing portion and the opaque feature onto a location of the target. Thus, in an exemplary use like golf training, a user can properly maintain vision on the target golf ball throughout the beginning and execution of the swing motion.

For example, the first viewing portion is a transparent or translucent vertically oriented slit, while the opaque feature is a horizontal line colored with a contrasting color to the opaque lenses. In such embodiments, these elements form a virtual crosshair which may be focused on the target such as a golf ball. The first and second lenses may also include a transparent or translucent region around a peripheral region of eyesight, to both help with maintaining balance during the swing and for the purpose of viewing a golf shot result after the swinging motion. However, the first and second lenses are opaque at all regions other than the optional transparent or translucent region at a periphery and the vertically oriented slit defining the first viewing portion. The lenses may be provided as part of a full set of glasses to be worn by a user, or as a clip-on occluder assembly configured to selectively connect to existing eyeglasses of a user. Furthermore, it will be appreciated that the specific shape and size of the transparent or translucent portions may be modified in various embodiments consistent with the disclosure herein.

According to another embodiment, a method of training a user to maintain vision focus on a golf ball throughout the motion of a golf swing is provided. The method includes equipping the user with an eyeglass assembly in accordance with the description above. The user positions himself in a swinging stance proximate to a target area including a golf ball. The user then uses the assembly to focus the first and second eyes on the golf ball by co-registering the first viewing portion and the opaque feature with the first and second eyes onto a location of the golf ball. The method also includes maintaining the focus on the golf ball during performance of a swinging motion to avoid head movements during the swinging motion.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION

Figure 1:
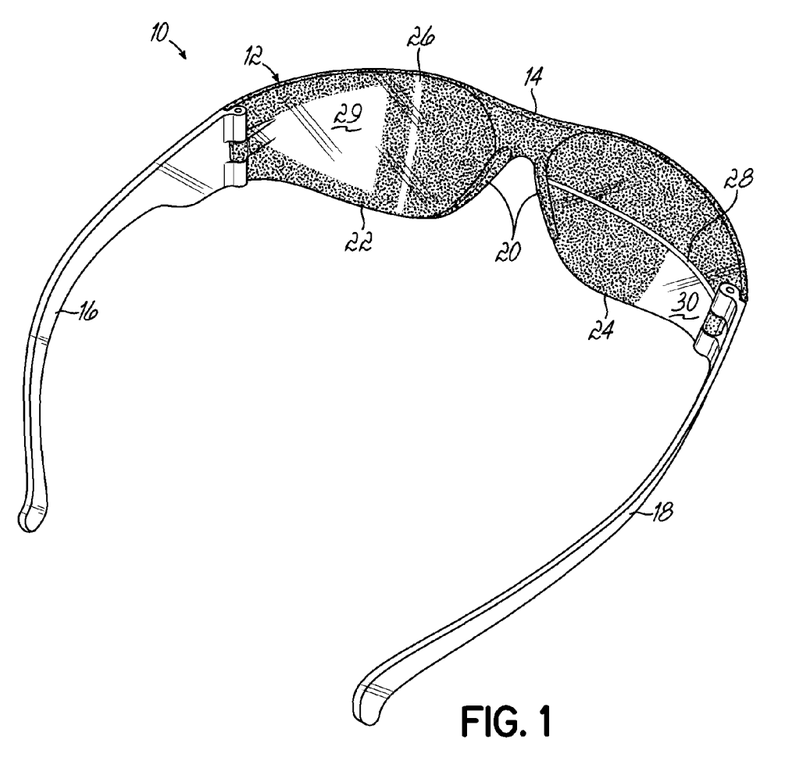
FIG. 1 is a rear perspective view of an eyeglass assembly according to one embodiment, showing various opaque and transparent or translucent features visible to a user when wearing the eyeglass assembly.

Referring to FIGS. 1 through 5, an eyeglass assembly 10 (hereinafter "assembly" 10) constructed in accordance with one illustrative embodiment of the invention and used, in one example, as a golf swing trainer or training aid is shown. With particular reference to FIG. 1, the assembly 10 is in the form of a complete set of eyeglasses in this embodiment. In this regard, the assembly 10 includes a frame 12 with a transverse member 14, ear pieces 16, 18, and a nose piece 20. Assembly 10 further includes a first lens 22 and a second lens 24 coupled to frame 12. It will be understood that the first and second lenses 22, 24 may be coupled together by the transverse member 14 and nose piece 20, or may alternatively be formed as a unitary piece which the transverse member 14 and/or the nose piece 20 (when required) are separately mounted upon.

While the illustrated embodiment shows first lens 22 as the left lens and second lens 24 as the right lens, the invention is not so limited. For example, first lens 22 may be the right lens, and second lens 24 may be the left lens, depending on the particular end user who may be right handed or left handed (to this end, the features described below may be moved to the opposite lenses in embodiments designed for a left-handed golfer). Frame 12 and nose piece 20 are completely opaque in this embodiment, such as by being painted over or coated with a black covering, in embodiments where the assembly 10 is produced from an original normal set of glasses such as safety glasses. First and second lenses 22, 24 are generally opaque but may include translucent or transparent viewing sections as discussed in further detail below. In this regard, lenses 22, 24 act as occluders for the eyes of the user when training a golf swing.

Advantageously in a golf training setting, the assembly 10 blocks substantially all vision of the user except at a focus area which may be maintained by co-locating elements seen in both lenses 22, 24 by the user's eyes on the golf ball throughout the golf swing motion. With repetitive training, this will cause muscle memory for the user to keep their eyes on the ball with the head pointed downwardly during a golf swing to avoid adverse effects on a golf swing which are caused by unnecessary eye and head movements. The assembly 10 also provides some peripheral vision capability in some embodiments for tracking the result of a golf shot or maintaining balance, but these small areas of additional vision capability do not detract from the overall function of blocking most of the vision field to avoid eye and head movements during the swing motion.

The opaque portions may be paint-like coatings applied to lenses that are originally translucent or transparent, in one example. Alternatively, the opaque areas in this and other embodiments may be made by etching, or other known methods from the manufacture such as spraying the area or making an opaque "wrap." The eyeglass assembly 10 may be formed from a pre-existing pair of safety glasses or sunglasses in this manner, in one example. Alternatively, the lenses may be formed with two different types of material (one translucent and one opaque), and/or formed with cutouts where the viewing portions need to be located, in alternative embodiments without departing from the scope of this invention.

Figure 2:
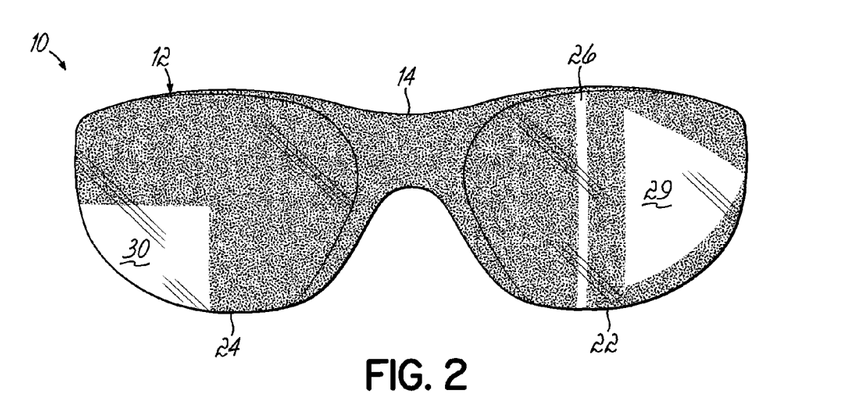
FIG. 2 is a front elevation view of the eyeglass assembly of FIG. 1.
Figure 3:
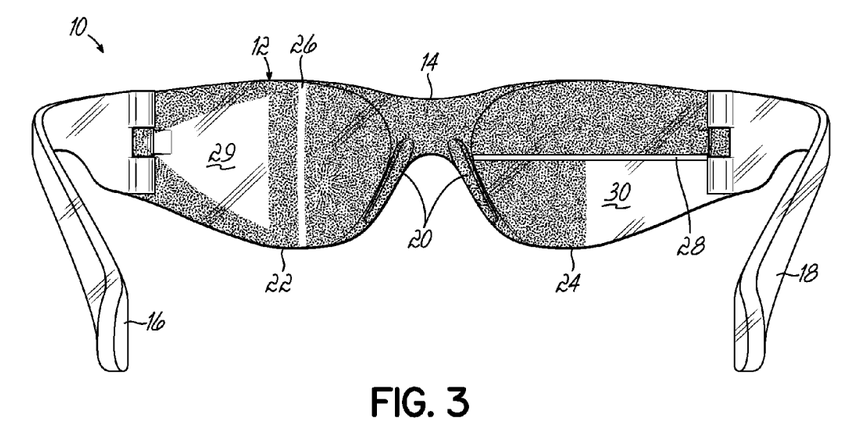
FIG. 3 is a rear elevation view of the eyeglass assembly of FIG. 1.

Now referring to FIGS. 2 and 3, first and second lenses 22, 24 are shown in more detail. The first lens 22 includes a first viewing portion defined at least in part by a translucent or transparent vertically oriented slit 26 which may be a clear vertical section as shown. The vertically oriented slit 26 is configured to generally align with the neutral position of the pupil of the user wearing the assembly 10. The vertically oriented slit 26 allows the user to see a limited field of vision. The first lens 22 is positioned in front of the dominant eye. For example, in a right-handed golfer, the left eye is dominant. The second lens 24 is positioned in front of the non-dominant, or contralateral, eye. The second lens 24 includes an opaque horizontal line 28 which is an opaque feature configured to generally align with the neutral position of the pupil of the user wearing the assembly 10. The alignment of the vertically oriented slit 26 and the horizontal line 28 may be done empirically by the user with the aid of one familiar with assessing the positioning of the pupil. These two features in combination provide the user with a means to train proper vision during a swing as set forth below.

The horizontal line 28 is visible against the background of the opaque area of the second lens 24. To this end, the horizontal line 28 is an opaque feature which is differentiated from a remainder of the opaque second lens 24. In one embodiment, for example, the lens 22 may be a black occluder and the horizontal line 28 may be white, or some other clearly contrasting color. Contralateral sensory input from, for example, horizontal line 28 is important to appropriate training because it prevents suppression. Suppression occurs when the body and brain adapt to a lack of stimuli and, for example, an unstimulated eye is effectively turned off. Providing some visual input to the contralateral eye is important to prevent suppression and keep both visual sensory systems involved in the training. Having both eyes active and working together keeps both halves of the brain working, which allows the arms and legs to be properly engaged during the golf swing. In other words, the more that the brain is involved (which is the case with a binocular process rather than a monocular process), the more processing power can be engaged to learn the task, e.g., a golf swing, in an efficient manner. The reference point generated by both eyes during use of the assembly 10 also helps the user properly maintain balance.

Figure 4:
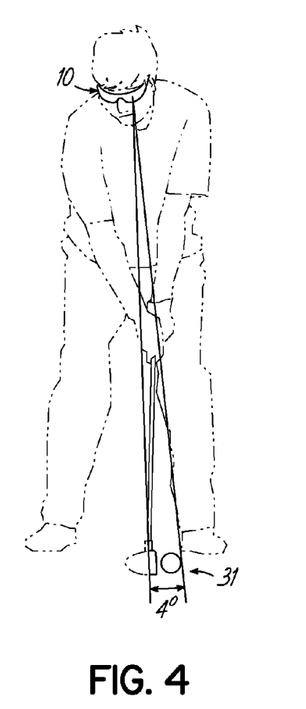
FIG. 4 is perspective view of a user wearing an eyeglass assembly according to one embodiment, e.g., during golf training with the eyeglass assembly.
Figure 5:
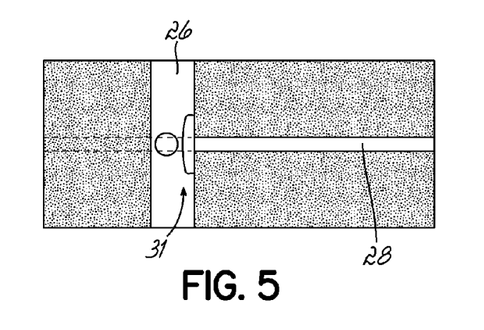
FIG. 5 is a schematic view estimating an appearance of the visual field seen by the user when wearing the eyeglass assembly of FIG. 4.

With reference now to FIGS. 4 and 5, the assembly 10 limits the user's field of vision and improves the ability to focus on a target area 31 including the ball. More specifically, the generally opaque lenses 22, 24 limit the field of vision to the vertically oriented slit 26. For example, the user may have a field of vision of about 4 degrees of arc as shown in FIG. 4. The width of the field of vision is determined in part by the distance of the lens 22 from the eye and the width of the vertically oriented slit 26. In one embodiment, the vertically oriented slit 26 may have a width of about 1 mm. Small variations of the field of vision around 4 degrees (such as 2.5 degrees to 6 degrees, in one example) are possible without departing from the scope of this disclosure. Additionally, lenses 22, 24 may wrap around the face to at least partially occlude the remainder of the field of vision, particularly in regions adjacent the target area. Alternatively, ear pieces 16, 18 may be configured to occlude peripheral vision. Limiting the field of vision reduces the distractions visible to the user when learning to focus on the target area, or in this example, the golf ball during a golf swing movement.

Still referring to FIG. 5, when a user is wearing assembly 10 and looking at a target (e.g., a golf ball) with both eyes open, the opaque horizontal line 28, in conjunction with the clear vertically oriented slit 26, keeps both eyes engaged and prompts a fusion or merging of the images. The configuration of lenses 22, 24 takes advantage of the ability of the eyes to co-register images, which is a category of vergence or superimposing of the images. When the user is looking at a target, the left eye sees a vertical view of the target, while the right eye sees a horizontal stripe. In other words, as can be seen in the schematic version of the view in FIG. 5, vertically oriented slit 26 and horizontal line 28 are effectively viewed together as a crosshair when co-registered by the eyes. Eyes intrinsically track to a target, and the crosshair effect of horizontal line 28 with the vertical visual field takes advantage of that intrinsic activity of the user's eyes. Accordingly, the crosshair keeps the eyes disciplined and focused on a specific target during, for example, a golf swing. Improving eye discipline will improve head and body control during and after the golf swing. This vertical and horizontal alignment of the eyes with the target is an improvement over current devices that attempt to merely limit a user's field of vision. Further, horizontal line 28 will aid in balance because it also stimulates the peripheral visual fields to prevent vestibular induced balance changes. To this end, the eyes are encouraged to align in a binocular manner rather than monocular, which is more effective for vision training and for maintaining balance.

Referring again to FIGS. 2 and 3, first and second lenses 22, 24 may also include additional features to improve a user's experience while using the assembly 10. The second lens 24 includes a second viewing portion in the form of a first transparent or translucent region 30 that is shown in the form of a clear generally rectangular section located adjacent the horizontal line 28 along a single quarter-portion of the second lens 24 and adjacent an outer edge of the second lens 24 (e.g., adjacent frame 12). As discussed above, sensory input on the contralateral eye will prevent peripheral vision loss associated vestibular dysfunction. In this manner, first transparent or translucent region 30 improves the balance of a user wearing assembly 10 during a golf swing. First transparent or translucent region 30 also provides visual feedback during a golf swing, wind up, and/or follow through. Permitting some peripheral vision in such a case can be very beneficial for monitoring swing mechanics. The visual sensory system in the peripheral visual fields is very adept at sensing and monitoring movement in the peripheral visual fields. Therefore, some peripheral visual field stimuli will improve balance and movement mechanics (without taking focus off the target area using the simulated crosshair described above. Thus, the second viewing portion provides the second eye of the user with a view not including the target region and the ball, while the first viewing portion provides the first eye of the user with a view including the target region and the ball.

The first lens 22 further includes a second transparent or translucent region 29 in the form of a clear triangular region adjacent an outer edge of the first lens 22 (e.g., adjacent frame 12). The second transparent or translucent region 29 is positioned between the ear piece 16 and vertically oriented slit 26 with a side of second transparent or translucent region 29 being generally parallel with vertically oriented slit 26, yet separated therefrom. The second transparent or translucent region 29 advantageously allows for the user to see the path of the golf ball after the swing (e.g., visually confirming the result of the swing) without interfering with the need to provide only a limited field of vision to avoid distractions during the swing. In this regard, the user can track with peripheral vision or otherwise the result of the golf swing (e.g., visualizing the golf shot after completion) without requiring removal of the assembly 10 and replacement before initiating the next swing, such as when training at a driving range. The second transparent or translucent region 29 thus may also help with adding peripheral visual field stimuli to improve balance and movement mechanics experienced during the performance of the golf swing. These first and second regions are enabling a limited amount of peripheral vision, for the reasons set forth above.

The use of the assembly 10 to train a golfer to maintain vision focus on a golf ball throughout the motion of a golf swing is readily understood when referencing FIGS. 4 and 5. To this end, the user is equipped with the assembly 10 and puts the eyeglass assembly 10 on the face like a normal pair of glasses. The user positions himself in a swinging stance proximate to the target area 31 with the ball as shown in FIG. 4. As shown in FIG. 5, the user then uses the assembly 10 to focus the first and second eyes on the golf ball by co-registering the first viewing portion (e.g., the vertically oriented slit 26) and the horizontal line 28, forming a virtual crosshairs on the golf ball. This focus point is maintained during the performance of a swinging motion, which keeps the eyes and the head stationary/motionless as is desirable during a golf swing. This avoids head movements that deleteriously affect a golf swing and its result. The assembly 10 may be used during repetitive training of the golf swing, or as a training reinforcement complement to be worn during actual rounds of golf, if desired by the end user.

FIGS. 6 through 12 show additional embodiments of eyeglass assemblies according to various embodiments of the invention. Throughout the figures, similar reference numerals refer to similar features, and these elements are not provided with duplicative explanation below where identical. General principles of eyeglass assemblies and training methods described above may also generally apply for the following embodiments described below. To this end, only the distinctions of these alternative embodiments are described in great detail below.

Figure 6:
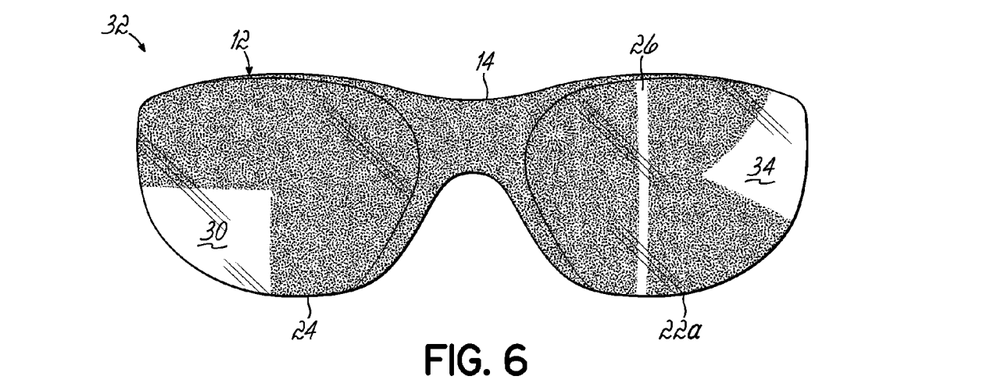
FIG. 6 is a front elevation view of an eyeglass assembly according to another embodiment.
Figure 7:
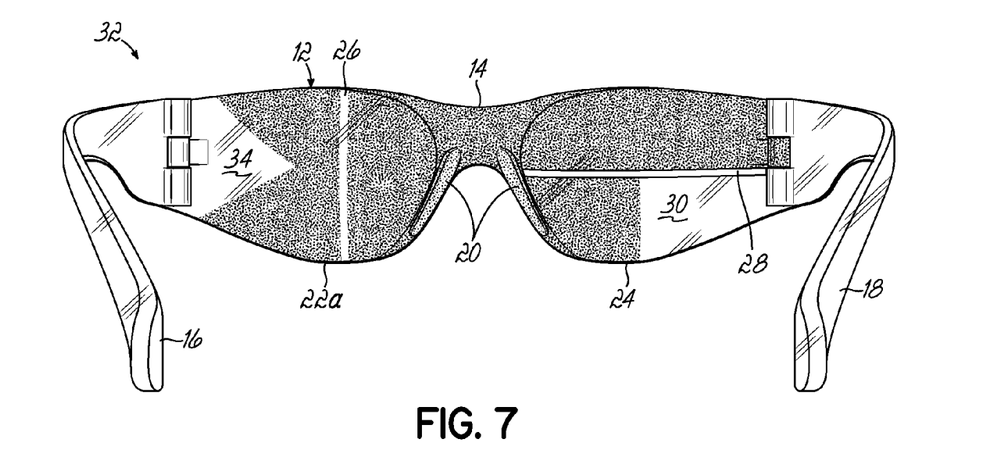
FIG. 7 is a rear elevation view of the eyeglass assembly of FIG. 6.

Referring to FIGS. 6 and 7, an eyeglass assembly 32 constructed in accordance with another illustrative embodiment of the invention is shown. The assembly 32 includes a first lens 22a again including vertically oriented slit 26. However, the second transparent or translucent region 29 of the previous embodiment has been replaced with a transparent or translucent peripheral V-shaped section 34 (which effectively defines the second transparent or translucent region in this embodiment). Peripheral V-shaped section 34 is positioned between the ear piece 16 and the vertically oriented slit 26 with the point of the peripheral V-shaped section 34 pointing toward vertically oriented slit 26. In this regard, the peripheral V-shaped section 34 is a mirror image of the triangular shape of the second transparent or translucent region 29 of the first embodiment. Similar to second transparent or translucent region 29, the V-shaped section 34 allows for the user to see the path of the golf ball after the swing through the first lens 22a without interfering with the limited field of vision during the swing.

Figure 8:
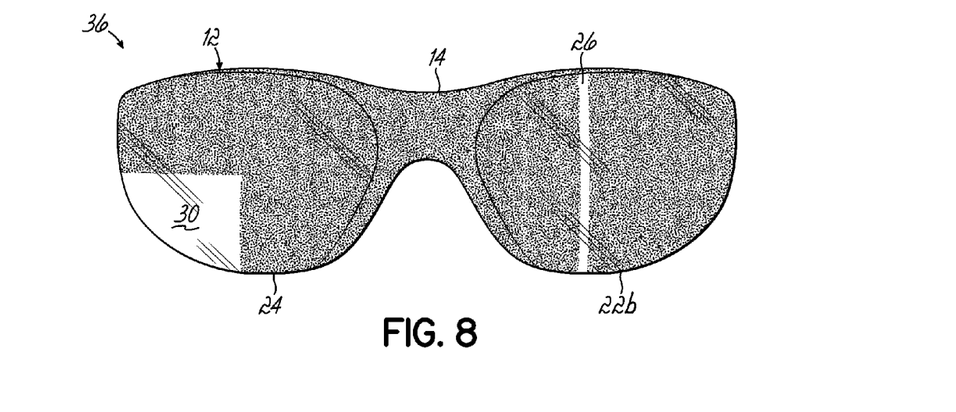
FIG. 8 is a front elevation view of an eyeglass assembly according to yet another embodiment.
Figure 9:
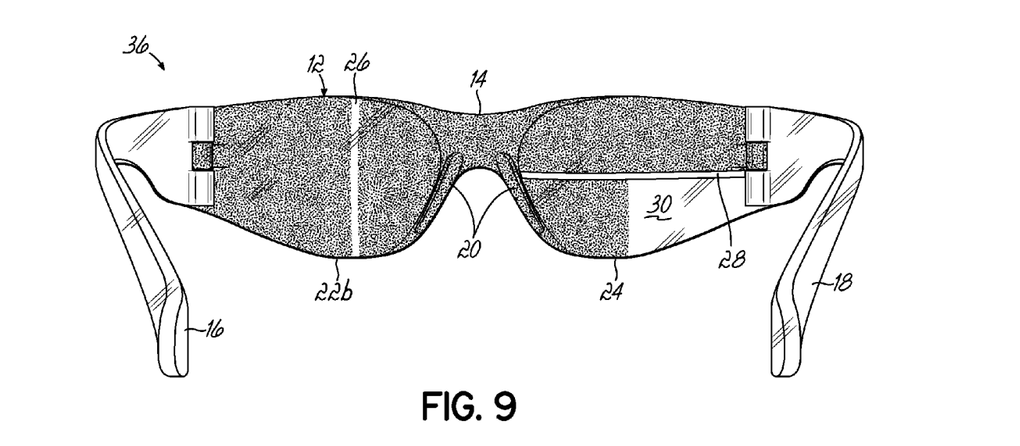
FIG. 9 is a rear elevation view of the eyeglass assembly of FIG. 8.

With reference to FIGS. 8 and 9, an eyeglass assembly 36 constructed in accordance with another illustrative embodiment of the invention is shown. The assembly 36 includes a first lens 22b including only vertically oriented slit 26. A second clear section, such as second transparent or translucent region 29 or V-shaped section 34, is not included in first lens 22b of this embodiment. With respect to all other aspects, the assembly 36 operates similarly to that described above in the first two embodiments. Those skilled in the art will recognize that various aspects of the present invention, such as a second clear section in lens 22b, may be included or excluded based on the preferences and skill level of the user (for example, some users will prefer less chance of peripheral distraction over the need to view the result of each shot immediately after a golf swing).

It will be understood based on these embodiments that the second transparent or translucent region 29 in the first lens 22 may vary in size and shape depending on the preferences of the end user. To this end, although a triangular-shaped opening apart from the opaque field of view may be provided in the examples detailed above, other shapes and sizes will be possible without departing from the scope of the invention. As long as the first lens 22 remains opaque along a substantial majority of the field of vision, and especially in regions proximate to the focus point provided by the vertically oriented slit 26 which is transparent or translucent, then the assembly 10 will remain useful for its intended vision training purposes.

Likewise, it will also be appreciated that the first transparent or translucent region 30 in the second lens 24 may also be modified to define different shapes and sizes than the generally rectangular opening shown in the Figures of the embodiments described above. For example, the first transparent or translucent region 30 may be triangular in shape to match the second transparent or translucent region 29. Again, so long as the second transparent or translucent region 30 does not interfere with the ability of the user's eyes to focus on the differentiated opaque feature, defined as a horizontal line 28 above, the assembly 10 will work for its intended vision training purpose regardless of the particular shape and size of the second transparent or translucent region 30.

Figure 10:
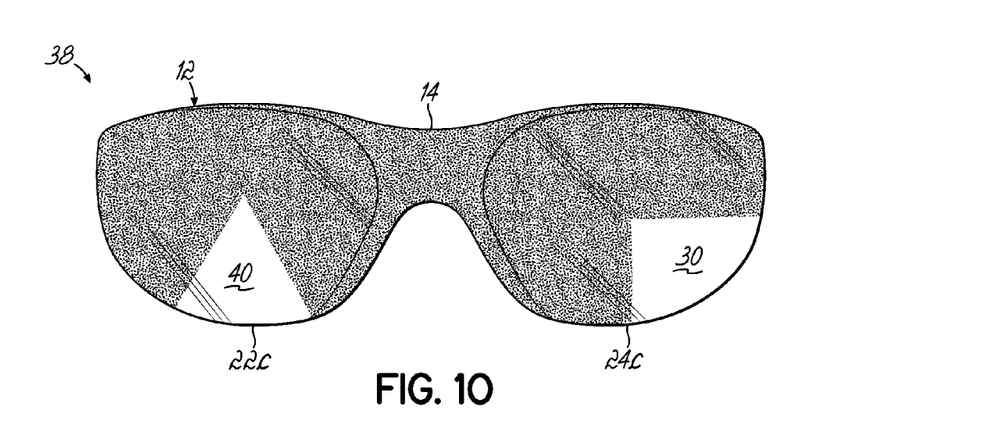
FIG. 10 is a front elevation view of an eyeglass assembly according to a further embodiment.
Figure 11:
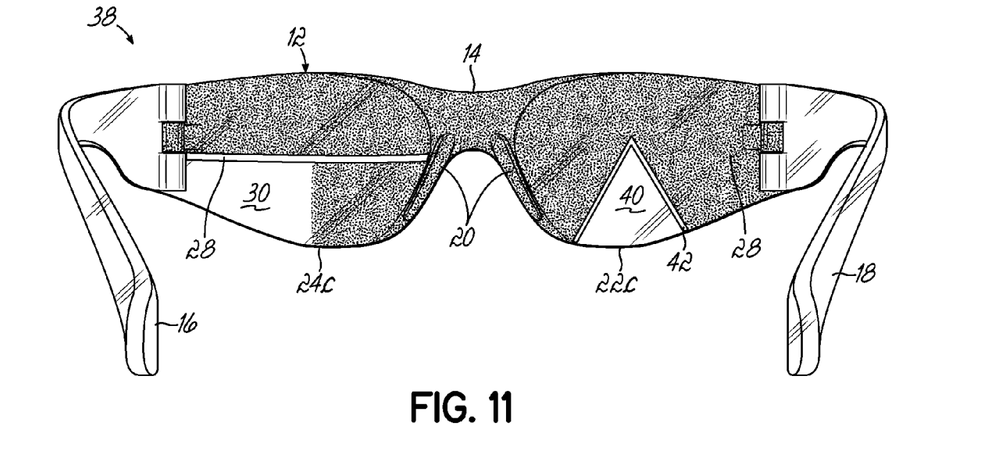
FIG. 11 is a rear elevation view of the eyeglass assembly of FIG. 10.

Referring now to FIGS. 10 and 11, an eyeglass assembly 38 according to a further exemplary embodiment is shown. Assembly 38 again includes frame 12 including transverse member 14, ear pieces 16, 18, and nose piece 20. The assembly 38 further includes first lens 22c and second lens 24c coupled to frame 12. Frame 12 and nose piece 20 are generally formed to be opaque. The first and second lenses 22c, 24c are generally opaque but may include clear sections or opaque viewing features as discussed further below. In this regard, lenses 22c, 24c act as occluders in a similar fashion as the embodiments described above. The first and second lenses 22c, 24c of this embodiment are in a reversed orientation from those shown in the previous embodiments to illustrate how those other embodiments could be modified in the case of making the assembly 38 for a left-handed golfer with a dominant right eye.

First lens 22c is positioned in front of the dominant eye—the right eye in this embodiment for a left handed golfer—and includes a first viewing portion in the form of a translucent or transparent V-shaped section 40. The terminal point of V-shaped section 40 is configured to generally align with the neutral position of the pupil of the user wearing the assembly 38. V-shaped section 40 opens or widens downwardly toward the bottom of lens 22c. First lens 22c further includes an opaque edge 42 defining the boundary around V-shaped section 40. The edge 42 includes a visual contrast that is visible against the background of the opaque area of the remainder of the first lens 22c, which can help in enhancing the focus on the corresponding eye on the terminal point of V-shaped section 40. The V-shaped section 40 functions in a similar manner as the vertically oriented slit of previous embodiments. Furthermore, such a V-shaped section 40 may be used in other sporting contexts like aligning a bowling shot without departing from the scope of the invention (thereby making the assembly 38 multi-functional).

Similar to prior embodiments described above, the second lens 24c includes the horizontal line 28 that is opaque and the second viewing portion in the form of a rectangular peripheral transparent or translucent region 30. The lenses 22c, 24c limit the user's field of vision while allowing the user to focus on a specific target when looking straight through the assembly 38. The user may focus the point of V-shaped section 40 on the target and co-register this point with the horizontal line 28 seen by the other eye, again resulting in a somewhat crosshair-like focus. The terminal point of the V-shaped section 40 keeps the eyes disciplined and focused on the target during, for example, a golf swing. Those skilled in the art will recognize that eyeglass assemblies according to these types of embodiments of the present invention may be useful in other applications. For example, the eyeglass assembly 38 with the V-shaped section 40 may be particularly suited for training in bowling, where a proper focus in vision is once again paramount during a throwing motion.

Figure 12:
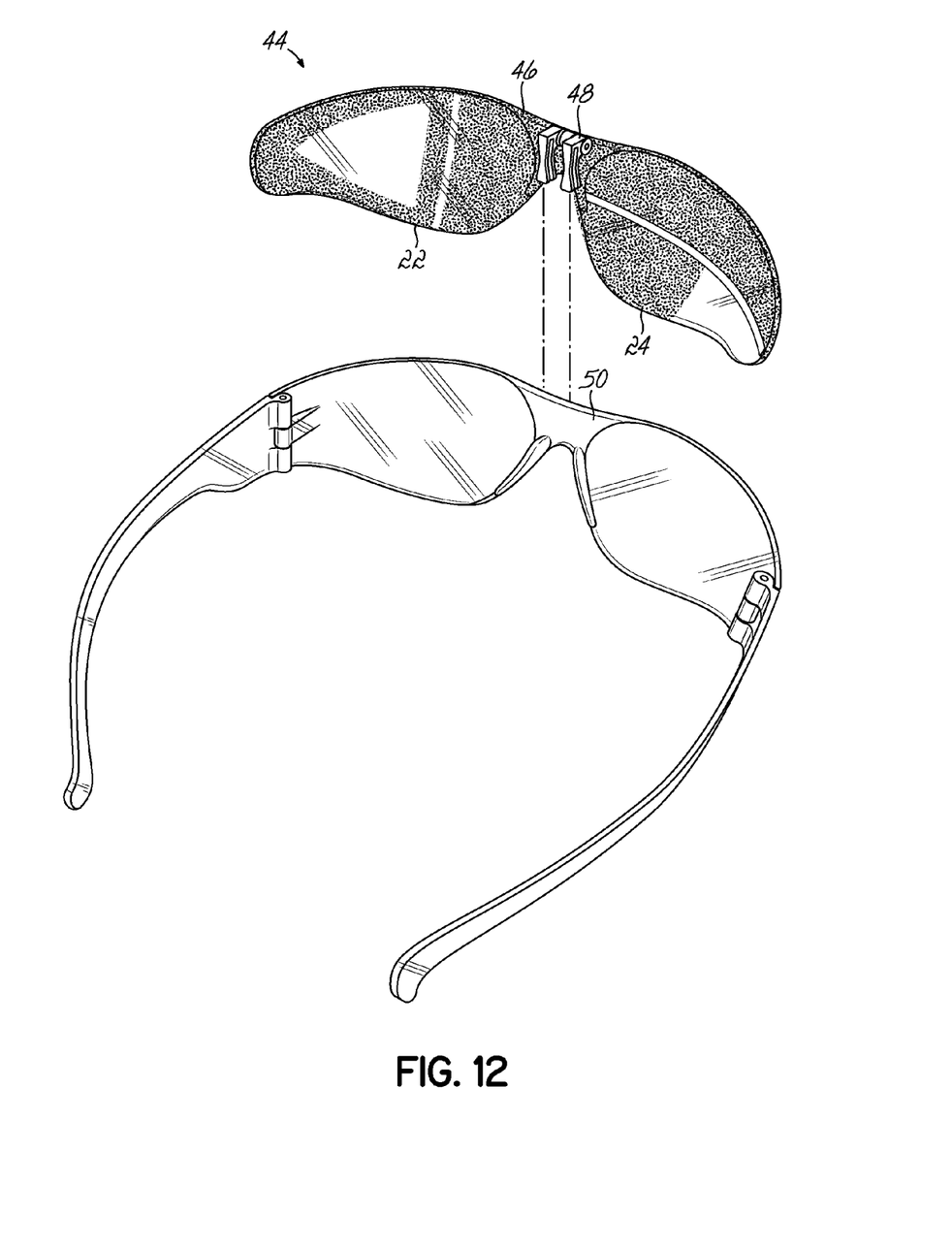
FIG. 12 is a perspective view of a clip-on occluder assembly according to another embodiment.

With reference now to FIG. 12, a clip-on occluder assembly 44 is shown in accordance with another embodiment of the invention. The clip-on occluder assembly 44 includes a frame 46, connection mechanism 48, and first and second lenses 22, 24 (which are shown with identical features as the first embodiment above). The connection mechanism 48 is configured to couple, such as by snapping together, the clip-on occluder assembly 44 to a conventional eyeglass frame 50 of a set of regular eyeglasses that may be worn by some users. This engagement to the conventional eyeglass frame 50 may be a snap-on connection. Frame 46 may be pivotably coupled to connection mechanism 48 such that frame 46 and lenses 22, 24 may be moved out of sight while remaining coupled to frame 50. It will be recognized that assemblies according to embodiments of the present invention may have alternate configurations. For example, lenses 22, 24 may be configured as monoculars (not shown). Regardless, this embodiment of the clip-on occluder assembly 44 shows that the benefits of the current invention can still be achieved in a different form factor for those users who also need to wear other glasses during training or play.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the general inventive concept.

What is claimed is:

1. An eyeglass assembly to enhance vision focus of a user comprising:
    a first lens that is opaque but also includes a first viewing portion which is configured to provide a first eye of the user with a first view of a target in a target region when the first eye focuses on the first viewing portion; and
    a second lens coupled to the first lens, the second lens being opaque but including a second viewing portion which is configured to provide a second eye of the user with a second view that does not include the target region, the second lens also including an opaque feature that is differentiated from a remainder of the opaque second lens,
    wherein the first viewing portion includes a translucent or transparent vertically oriented slit;
    the second viewing portion is a first transparent or translucent region positioned adjacent an outer edge of the second lens spaced apart from the first lens, the second viewing portion enabling a limited amount of peripheral vision for helping the user maintain their balance;
    the opaque feature includes a horizontal line,
    the vertically oriented slit and the horizontal line form a virtual crosshair that may be aligned with the target when the first and second eyes of the user co-register the vertically oriented slit and the horizontal line,
    wherein the first lens further includes a second transparent or translucent region which is spaced apart from the vertically oriented slit and located adjacent an outer edge of the first lens which is spaced apart from the second lens, the second transparent or translucent region enabling a limited amount of peripheral vision for visualizing a golf shot after completion of a golf swing, and
    wherein the first transparent or translucent region is adjacent to the horizontal line along a single quarter-portion of the second lens, and wherein the second transparent or translucent region is generally triangular in shape.

2. The eyeglass assembly of claim 1, wherein the first and second lenses define opaque portions at all portions other than the translucent or transparent vertically oriented slit and the first and second transparent or translucent regions, thereby obscuring vision except at a peripheral region of the assembly and at a focus point for the target.

3. The eyeglass assembly of claim 1, wherein the vertically oriented slit limits a field of vision of the first eye of the user to an arc of about 4 degrees that may be moved to the target when focusing on the target.

4. The eyeglass assembly of claim 1, wherein the first and second lenses are coupled together with ear pieces extending from outer edges thereof to form a full set of glasses that may be worn by the user.

5. The eyeglass assembly of claim 1, wherein a connection mechanism is coupled to the first and second lenses and configured to snap into engagement with a conventional set of eyeglasses, such that the first and second lenses and the connection mechanism define a clip-on occluder assembly that may be selectively retained on any set of conventional eyeglasses.

* * * * *